(12) United States Patent
Daniels et al.

(10) Patent No.: US 7,643,856 B2
(45) Date of Patent: Jan. 5, 2010

(54) METHOD FOR REDUCING APPARENT LATENCY IN LINKING A CALL RECEIVED AT A MOBILE COMMUNICATION DEVICE TO A REMOTE AUDIO PROCESSOR

(75) Inventors: Jared R. Daniels, Sunrise, FL (US);
James L. Howard, Davie, FL (US);
Nitin Singh, Coral Springs, FL (US)

(73) Assignee: Motorola, Inc., Schaumburg, IL (US)

( * ) Notice: Subject to any disclaimer, the term of this patent is extended or adjusted under 35 U.S.C. 154(b) by 600 days.

(21) Appl. No.: 11/298,398

(22) Filed: Dec. 9, 2005

(65) Prior Publication Data

US 2007/0135148 A1    Jun. 14, 2007

(51) Int. Cl.
*H04M 1/00* (2006.01)
(52) U.S. Cl. .................... 455/575.2; 455/567
(58) Field of Classification Search ............... 455/575.2, 455/568, 574, 127.5, 41.2; 370/324, 350, 370/245, 338, 908
See application file for complete search history.

(56) References Cited

U.S. PATENT DOCUMENTS

| | | | |
|---|---|---|---|
| 5,448,620 A | 9/1995 | Gershkovich et al. | |
| 5,953,674 A | 9/1999 | Hutchison, IV | |
| 6,477,183 B1 | 11/2002 | Yamamoto | |
| 7,155,264 B2 | 12/2006 | Twitchell, Jr. | |
| 7,359,738 B2 | 4/2008 | Daniels et al. | |
| 2002/0115478 A1 | 8/2002 | Fujisawa et al. | |
| 2002/0183050 A1 | 12/2002 | Kuon | |
| 2002/0197994 A1* | 12/2002 | Harris et al. | 455/445 |
| 2002/0198031 A1 | 12/2002 | Holmes et al. | |
| 2003/0119568 A1 | 6/2003 | Menard | |
| 2003/0152056 A1 | 8/2003 | Lee et al. | |
| 2003/0166409 A1* | 9/2003 | Ishii | 455/569 |
| 2003/0186716 A1 | 10/2003 | Dorenbosch et al. | |
| 2004/0185857 A1 | 9/2004 | Lee | |
| 2004/0198422 A1* | 10/2004 | Sato | 455/552.1 |
| 2004/0229658 A1 | 11/2004 | Kim et al. | |
| 2005/0020299 A1 | 1/2005 | Malone et al. | |
| 2005/0143145 A1 | 6/2005 | Maekawa | |
| 2005/0202844 A1 | 9/2005 | Jabri et al. | |
| 2006/0056332 A1 | 3/2006 | Arase et al. | |
| 2006/0084384 A1* | 4/2006 | Kiemunki | 455/41.3 |
| 2006/0217061 A1 | 9/2006 | Steele et al. | |

* cited by examiner

*Primary Examiner*—Tu X Nguyen
(74) *Attorney, Agent, or Firm*—Scott M. Garrett; Sylvia Chen

(57) ABSTRACT

A mobile communication device (100) uses a local wireless transceiver (108) to establish an asynchronous link (202) with a remote audio processor (110) which is typically operated in a low power mode and that maintains an association between the mobile communication device and remote audio processor. When the mobile communication device receives an incoming call page (210), the mobile communication device initiates a synchronous link with the remote audio processor, and responds to the incoming call page at a time when the call will be connected only after the synchronous link is established.

18 Claims, 3 Drawing Sheets

METHOD FOR REDUCING APPARENT LATENCY IN LINKING A CALL RECEIVED AT A MOBILE COMMUNICATION DEVICE TO A REMOTE AUDIO PROCESSOR

TECHNICAL FIELD

This invention relates in general to wireless communications, and more particularly to using remotely operated audio accessories via a wireless link with a mobile communication device.

BACKGROUND OF THE INVENTION

Mobile communication devices are in widespread use throughout the world, and in particular in the metropolitan regions of the world. The cost of these devices and communication service has decreased so much over recent years that they are nearly as common as landline telephone communications. To remain competitive manufacturers have added functionality to their mobile communication device product to distinguish their products over those of other manufacturers.

One feature that has proven popular is the so called push to talk or dispatch mode of communications. In addition to conventional mobile telephony service, referred to as interconnect calling, these devices and systems support dispatch calling. Dispatch calling is a half duplex mode of calling resembling two way radio or walkie talkie operation. Furthermore dispatch calling is controlled by a push to talk operation where, when the party, for example, presses a push to talk button and begins speaking. Therefore the dispatch mode requires a low call set up latency so as to be as near instantaneous as possible. At the receiving device, as soon as an incoming dispatch call is received, unlike an interconnect call, the receiving device, upon responding to the incoming call page from the communication system, quickly unmutes a loudspeaker and begins playing the received audio information without any action on the part of the user of the receiving device.

A variety of accessories are available for mobile communication devices, and one particular type that has proven popular recently is a wireless earpiece. A wireless earpiece is worn on a user's ear, and connects to the mobile communication device via local wireless link, such as that known by the name Bluetooth. Since these accessories operate wirelessly with the mobile communication device, they must have their own power source, but because they are worn on the user's ear, they must also be small, so a large battery cannot be used. Consequently it is desirable to operate the earpiece in low power mode as much as possible. One way to achieve power saving operation is to have the earpiece go into a "sleep" mode and check periodically to see if the mobile communication device is transmitting anything to it. Such operation works fine with interconnect calling because in interconnect calling, before any audio information is received, the user of the receiving device must first answer the call, which gives the mobile communication device time to wake up the earpiece to an active state. However, with dispatch calling, the latency in waking up the earpiece becomes critical. If the mobile communication device responds to the incoming dispatch call and the incoming dispatch call is set up before the earpiece is awake, a portion of the transmitted speech may be lost or not heard by the user. Therefore, there is a need to reduce the time it takes to wake up the earpiece from a low power state to an active state for handling dispatch calling.

DETAILED DESCRIPTION

Figure 1:
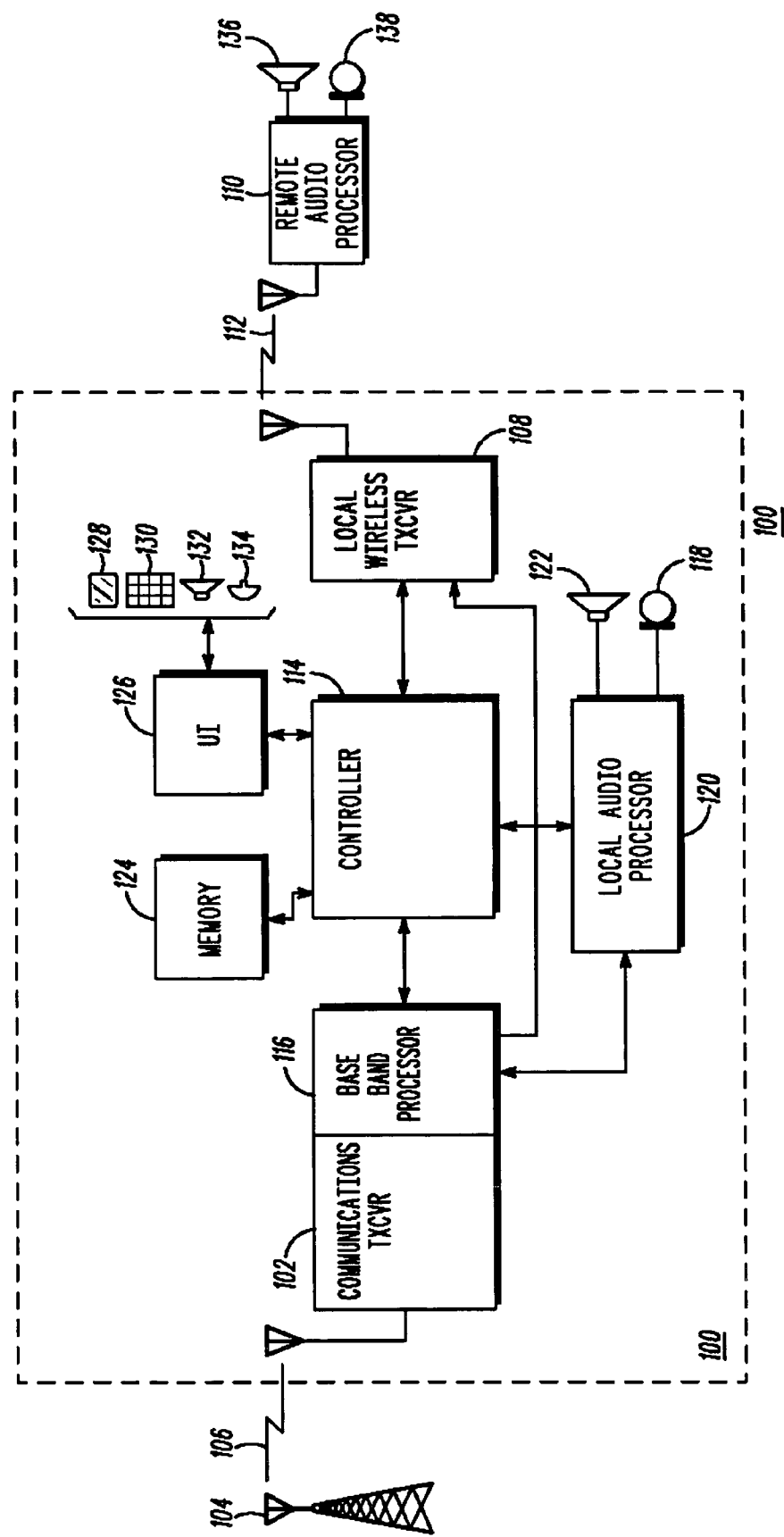
FIG. 1 shows a block schematic diagram of a mobile communication device and associated network entities, in accordance with an embodiment of the invention.

While the specification concludes with claims defining the features of the invention that are regarded as novel, it is believed that the invention will be better understood from a consideration of the following description in conjunction with the drawing figures, in which like reference numerals are carried forward. The invention solves the problem of latency in receiving a call such as a dispatch call at a remote audio processor, such as a wireless earpiece that is wirelessly linked to the mobile communication device, by responding to an incoming call page only when the call will be established after an audio link is established between the mobile communication device and remote audio processor.

Referring now to FIG. 1, there is shown a block schematic diagram of a mobile communication device 100 and associated network entities, in accordance with an embodiment of the invention. The mobile communication device 100 comprises a communications transceiver 102 for communicating with a base station 104 of a communication network over an air interface 106.

The mobile communication device 100 also comprises a local wireless transceiver 108 for communicating wirelessly with devices in close proximity to the mobile communication device, such as a remote audio processor 110. The remote audio processor may be, for example, a wireless earpiece & microphone to allow the user of the mobile communication device to speak with others without having to hold the mobile communication device to the user's head. The mobile communication device and the remote audio processor communicate over a low power, low range wireless interface 112, such as the Bluetooth specification (www.bluetooth.org).

According to the Bluetooth specification, communication occurs in the unlicensed industrial, scientific, and medical (ISM) band at 2.4 GHz. The transceiver utilizes frequency hopping to reduce interference and fading. A typical Bluetooth device has a range of about 10 meters. The communication channel can support both data (asynchronous) and voice (synchronous) communications with a total bandwidth of 1 Mb/sec. The synchronous voice channels are provided using circuit switching with a slot reservation at fixed intervals. A synchronous link is referred to as an SCO (synchronous connection-oriented) link. The asynchronous data channels are provided using packet switching utilizing a polling access scheme. An asynchronous link is referred to as an ACL (asynchronous connection-less) link. A combined data-voice SCO packet is also defined. This can provide 64 kb/sec voice and 64 kb/sec data in each direction.

In the mobile communication device 100, the local wireless transceiver may receive audio data from a controller 114 or a baseband processor 116 which is operably coupled to the communications transceiver 102. The baseband processor, among other tasks, processes signals for modulation and transmission by the communications transceiver, as well as receiving demodulated signals from the cellular communications transceiver. For example, acoustic audio signals may be received at a microphone 118, which is coupled to a local audio processor 120. The local audio processor digitizes the acoustic audio signal and provides the digital audio signal to the baseband processor for transmission when the mobile communication device is engaged in a call, normally.

Similarly, the baseband processor provides received digital audio signals to the audio processor to be played over a speaker 122. The local audio processor is used when an external headset or remote audio processor is not being used. The speaker 122 is conventionally part of an earpiece and the microphone is conventionally part of a mouthpiece. The controller supervises operation of the various elements and subsystems, including the baseband processor and communications transceiver, local wireless transceiver, and local audio processor. The controller operates according to control or instruction code and various parameters stored in a collective memory 124 which may include RAM, ROM, and semi-permanent memory such as flash memory. Furthermore, the controller facilitates a user interface 126 which may include graphical display elements 128, button and keypad elements 130, audio elements 132, and vibrational or tactile elements 134.

In operation, the remote audio processor is first associated with the mobile communication device. An asynchronous link is maintained between them. Once they are associated, they may each put their transceivers into a low power state, and periodically power up to perform a handshake and determine if a synchronous link needs to be established, such as during a call. During a call the remote audio processor has a speaker 136 and a microphone 138 which are used instead of those coupled to the local audio processor. To avoid the problem of cutting off a portion of an incoming call the mobile communication device only responds to the incoming dispatch call page at a time when the link between the mobile communication device and the remote audio processor will have had time to come up to full power, synchronous mode. There are a variety of ways this may be accomplished. For example, the mobile communication device may simply wait until after the synchronous link is established. Another method is to delay responding the incoming dispatch call page for a specific delay time selected to ensure that even if the incoming dispatch call page is received at the start beginning of a low power stage of the asynchronous link, the incoming dispatch call will not be established until the synchronous link is established, even of the mobile communication device responds to the incoming dispatch call page before the synchronous link is requested, taking advantage of the inherent delay time between the response and the time the call is established between the mobile communication device and the communications system.

Figure 2:
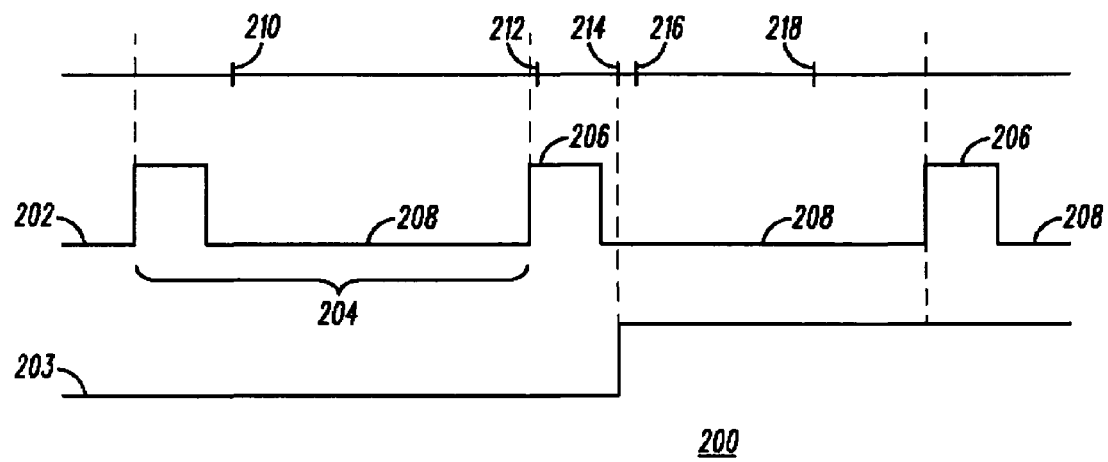
FIGS. 2 and 3 show time event graphs of processes for reducing apparent latency in receiving a dispatch call at a remote audio processor, in accordance with an embodiment of the invention.

Referring now to FIG. 2, there is shown a time event graph 200 of a process for reducing apparent latency in receiving a call such as a dispatch call at a remote audio processor, in accordance with an embodiment of the invention. Line 202 represents the asynchronous link activity, where brief handshaking exchanges between mobile communication device and remote audio processor occur once every link interval 204. Line 203 represents the activity of the synchronous link. The link interval includes active periods 206 and inactive periods 208. The active periods are primarily for handshaking and may be referred to as sniff periods. The link is inactive for most of the link interval, and it is during this time that the local wireless transceiver and the audio processor are in a low power state. Both devices wake up during the active periods to briefly handshake, when there is no other process to perform. When a call is received, such as at time 210, while the link is inactive, the local wireless transceiver must wait until the next active period to request a synchronous link be established at time 212. Subsequently, the synchronous link is established at time 214, as indicated by the synchronous link line going high at that time. Once the synchronous link is established, the mobile communication device responds to the incoming call page at time 216, and the incoming call is established or connected at time 218. Since the synchronous link is established by time 218, no audio data of an incoming dispatch call is lost, and the user of the remote audio processor will hear all of the incoming dispatch call. It will be appreciated by those skilled in the art that the asynchronous link may transition to the synchronous link, or they may be maintained independent of each other over the same wireless bearer. In embodiments employing the Bluetooth interface, the asynchronous and synchronous links will be maintained separately. Furthermore, it will be appreciated by those skilled in the art that several active periods 206 may occur before the synchronous link is established.

Figure 3:
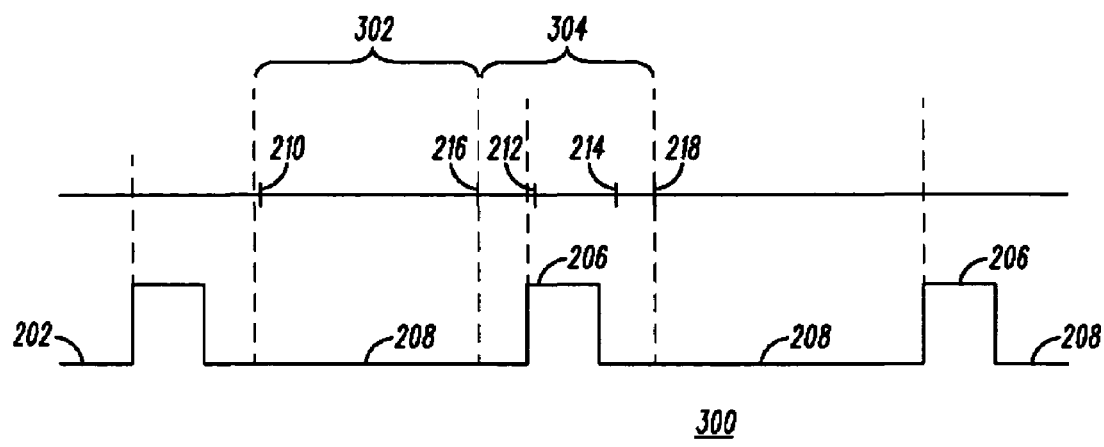

FIG. 3 shows an alternative time event graph 300 of a process for reducing apparent latency in receiving a call such as a dispatch call at a remote audio processor, in accordance with an embodiment of the invention. Upon receiving the incoming call page at time 210, the mobile communication device waits a period of time 302 before responding to the page at time 216.

Subsequent to responding to the incoming call page, the communication system requires minimum time period 304 to connect the call to the mobile communication device. As in FIG. 2, by the time the call is connected at time 218, the mobile communication device has had time to request the establishment of the synchronous link at time 212, and the synchronous link is established at time 214, prior to connection of the call at time 218. Accordingly, upon receipt of the incoming call page at time 210, the mobile communication device may either wait until time 216, which is preselected to account for the connection delay time 304 to ensure the synchronous link will be established before the call is connected, or the response delay period may be a fixed time period selected, in addition to connection delay time 304, to ensure that the synchronous link is established prior to connection of the call.

In one embodiment of the invention, a combination of the processes illustrated in FIGS. 2 & 3 may be used. The mobile communication device may initiate the process of FIG. 3, but if this begins late in the link interval, the synchronous link will be established substantially before the delay period 302 is over. So rather than continue to wait until the end of the delay period 302, the mobile communication device simply responds to the incoming call page prior to the expiration of the delay period, and after the synchronous link is established.

According to another embodiment of the invention, the mobile communication device 100 avoids audio loss of an incoming call. The mobile communication device first establishes a data link with the remote audio processor 110 with the local wireless transceiver 108. To conserve power, the data link is mostly limited to periodic handshaking to confirm the continued presence of the two within radio range of each other. The data link may utilize packet switching and a polling access scheme to maintain the link. Once an incoming call page is received at the communications transceiver 102, the mobile communication device must wait for a handshaking interval 206 to request establishment of a voice link between the local wireless transceiver 108 and the remote audio processor 110. The voice link uses circuit switching with a slot reservation at fixed intervals. To ensure all voice data received at the communications transceiver 102 is relayed to the remote audio processor 110, the communications transceiver delays responding to the incoming call page 210 until a time when connection of the call 218 will occur subsequent to the establishment of the voice link 214 between the remote audio processor and the local wireless transceiver.

Figure 4:
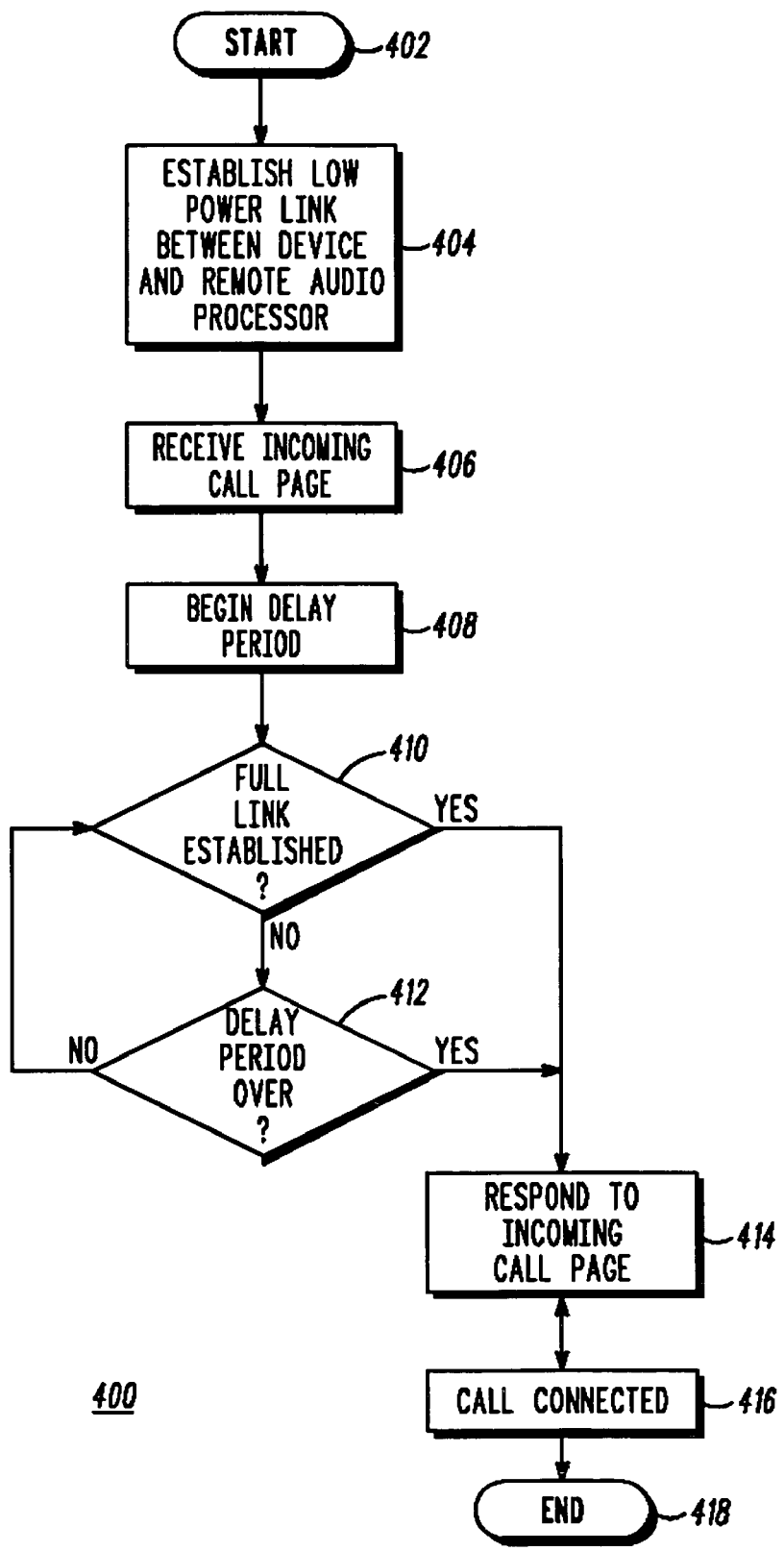
FIG. 4 shows a flow chart diagram of a method for reducing apparent latency in receiving a dispatch call at a remote audio processor, in accordance with an embodiment of the invention.

Referring now to FIG. 4, there is shown a flow chart diagram 400 of a method for reducing apparent latency in receiving a call at a remote audio processor, in accordance with an embodiment of the invention. At the start 402, the mobile communication device is powered on, affiliated with a base station of a communication system, and ready to receive communication signals. The method commences by establishing the asynchronous link 404 between the mobile communication device and the remote audio processor over the local wireless network. Once established, the asynchronous link may be maintained in a low power state. Upon commencement of the low power link, the mobile communication device subsequently receives an incoming call page 406 from the communication system. Ordinarily the mobile communication device would respond immediately to the page because in dispatch communication, rapid call set up is desirable. However, according to the invention, a delay period is commenced 408 prior to responding. Upon commencement of the delay period, the mobile communication device seeks to establish a synchronous link with the remote audio processor, and a loop begins where the mobile communication device determines if the synchronous link is established 410. If the synchronous link is not yet established, the mobile communication device next determines if the delay period is over 412. If the delay period is not over, the method continues looping until either the synchronous link is established or the delay period is over, whereupon the mobile communication device then responds to the incoming call page 414, and subsequently the call is connected to the mobile communication device 416 and the method ends 418. It will be appreciated by those skilled in the art that, although the invention is particularly advantageous with incoming dispatch calls, other call types such as interconnect calls may be handled in the same manner according to the invention. Although responding to an interconnect call is not, typically, as urgent as responding to a dispatch call, the invention may be used to increase the time between handshaking periods of the asynchronous link when operated in a low power state, thus allowing even greater power savings.

Thus, the invention provides a method for reducing apparent latency in linking a call received at a mobile communication device to a remote audio processor. The method commences by establishing an asynchronous link between the remote audio processor and the mobile communication device. Upon receiving an incoming call page at the mobile communication device from a wireless communication system, the mobile communication device commences initiating a synchronous link between the remote audio processor and the mobile communication device. The synchronous link has a minimum set up time required to establish the synchronous link. The mobile communication device responds to the incoming call page at a time such that the synchronous link is established prior to the incoming call being established between the mobile communication device and the wireless communication system. One embodiment of the method comprises, upon establishing the synchronous link, responding to the incoming call page after establishing the synchronous link. An alternative embodiment comprises responding to the incoming call page after a delay time. The delay time may be selected to ensure the incoming call is established after a sniff period of the asynchronous link during which the synchronous link is initiated. If the synchronous link is established before expiration of the delay time, the method may commence responding to the incoming call page after the synchronous link is established and before expiration of the delay time. Both the asynchronous and synchronous links may be established over a Bluetooth interface. Furthermore the method may comprise alerting, via a user interface, a user of the mobile communication device of the incoming call after establishing the synchronous link.

The invention further provides a mobile communication device including a local wireless transceiver, and communications transceiver, and a controller operably coupled to the local wireless transceiver and communications transceiver. The local wireless transceiver is operable in an asynchronous link mode and a synchronous link mode for communicating with a remote audio processor. The communications transceiver communicates with a communications base station. The local wireless transceiver establishes an asynchronous link with a remote audio processor, and upon reception of an incoming call page at the communications transceiver, the communications transceiver responds to the incoming call page at a time when the synchronous link mode is established prior to connection of the call.

The invention further provides a method of avoiding audio loss between a mobile communication device and an associated remote audio processor upon connection of a call. The method commence by establishing a data link between the remote audio processor and a local wireless transceiver of the mobile communication device. At some time after establishing the data link, the mobile communication device receives an incoming call page at a communications transceiver of the mobile communication device. Subsequent to receiving the incoming call page, the mobile communication device commences initiating a voice link between the remote audio processor and the local wireless transceiver, which results in establishing the voice link. The mobile communication device commences responding to the incoming call page at a time when connection of the call will occur only after establishing the voice link. Establishing the data link may include maintaining the local wireless transceiver in a low power state for a majority of a link interval, and handshaking with the remote audio processor during periodic handshaking periods of the link interval. In one embodiment, responding to the incoming call page may be performed prior to initiating the voice link. In another embodiment, responding to the incoming call may be performed after a delay period commenced after receiving the incoming call page. In an alternative embodiment responding to the incoming call page may be performed after the establishing the voice link. In a further alternative embodiment, responding to the incoming call page may be performed after the earlier occurrence of either establishing the voice link, or a delay period.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A method for reducing apparent latency in linking a call received at a mobile communication device to a remote audio processor, comprising:

establishing an asynchronous link between the remote audio processor and the mobile communication device;

receiving an incoming call page at the mobile communication device from a wireless communication system after the establishing, the incoming call page indicating the wireless communication system is attempting to connect an incoming call to the mobile communication device;

initiating a synchronous link between the remote audio processor and the mobile communication device, the synchronous link having a minimum set up time;

alerting a user of the mobile communication device of the incoming call after establishing the synchronous link; and responding to the incoming call page at a time where the synchronous link will be established prior to the incoming call being established.

2. A method for reducing apparent latency as defined in claim 1, further comprising establishing the synchronous link, and wherein responding to the incoming call page is performed after establishing the synchronous link.

3. A method for reducing apparent latency as defined in claim 1, wherein responding to the incoming call page is performed after a delay time.

4. A method for reducing apparent latency as defined in claim 3, wherein the delay time is selected to ensure the incoming call is established after a sniff period of the asynchronous link where the synchronous link is initiated.

5. A method for reducing apparent latency as defined in claim 3, wherein if the synchronous link is established before expiration of the delay time, responding to the incoming call page after the synchronous link is established and before expiration of the delay time.

6. A method for reducing apparent latency as defined in claim 1, wherein receiving the incoming call page is receiving an incoming dispatch call page.

7. A mobile communication device, comprising:

a local wireless transceiver operable in an asynchronous link mode and a synchronous link mode for communicating with a remote audio processor;

a communications transceiver which communicates with a communications base station;

a controller operably coupled to the local wireless transceiver and the communications transceiver;

wherein the local wireless transceiver establishes an asynchronous link with a remote audio processor, and upon reception of an incoming call page at the communications transceiver after the establishing, the incoming call page indicating a call is forthcoming, the controller alerts a user of the mobile communication device of the call after establishing an synchronous link, and the communications transceiver responds to the incoming call page at a time when the synchronous link mode is established prior to connection of the call.

8. A mobile communication device as defined in claim 7, wherein the communications transceiver responds to the incoming call page after the local wireless transceiver synchronous link is established by the local wireless transceiver.

9. A mobile communication device as defined in claim 7, wherein the communications transceiver responds to the incoming call page after a preselected delay time.

10. A mobile communication device as defined in claim 9, wherein the delay time is selected to ensure the call is established after an occurrence of a sniff period of the asynchronous link where the synchronous link is initiated by the local wireless transceiver.

11. A mobile communication device as defined in claim 9, wherein if the synchronous link is established before expiration of the delay time, the communications transceiver responds to the incoming call page after the synchronous link is established and before expiration of the delay time.

12. A mobile communication device as defined in claim 9, wherein the local wireless transceiver operates according to a Bluetooth interface.

13. A method of avoiding audio loss between a mobile communication device and an associated remote audio processor upon connection of a call, comprising:

establishing a data link between the remote audio processor and a local wireless transceiver of the mobile communication device;

receiving an incoming call page at a communications transceiver of the mobile communication device after the establishing;

subsequent to receiving the incoming call page, initiating a voice link between the remote audio processor and the local wireless transceiver;

establishing the voice link;

alerting a user of the mobile communication device of the incoming call page after establishing the voice link; and responding to the incoming call page at a time when connection of the call will occur only after establishing the voice link.

14. A method of avoiding audio loss as defined by claim 13, wherein establishing the data link comprises:

maintaining the local wireless transceiver in a low power state for a majority of a link interval; and handshaking with the remote audio processor during periodic handshaking periods of the link interval.

15. A method of avoiding audio loss as defined by claim 13, wherein responding to the incoming dispatch call page is performed prior to initiating the voice link.

16. A method of avoiding audio loss as defined by claim 13, wherein responding to the incoming call is performed after a delay period after receiving the incoming call page.

17. A method of avoiding audio loss as defined by claim 13, wherein responding to the incoming call page is performed after the establishing the voice link.

18. A method of avoiding audio loss as defined by claim 13, wherein responding to the incoming call page is performed after the earlier occurrence of either establishing the voice link, or a delay period.

* * * * *